United States Patent
Shiojima

(10) Patent No.: US 7,026,726 B2
(45) Date of Patent: Apr. 11, 2006

(54) UNINTERRUPTIBLE POWER SUPPLY DEVICE

(75) Inventor: Nobuo Shiojima, Takasaki (JP)

(73) Assignee: Sanyo Electric Co., Ltd., Osaka (JP)

( * ) Notice: Subject to any disclaimer, the term of this patent is extended or adjusted under 35 U.S.C. 154(b) by 56 days.

(21) Appl. No.: 10/893,354

(22) Filed: Jul. 19, 2004

(65) Prior Publication Data

US 2005/0024905 A1    Feb. 3, 2005

(30) Foreign Application Priority Data

Jul. 29, 2003    (JP)    ............................ 2003-282088

(51) Int. Cl.
*H02J 9/00*    (2006.01)
*H02J 7/00*    (2006.01)

(52) U.S. Cl. ........................ 307/66; 320/133
(58) Field of Classification Search ................ 307/66, 307/64, 43; 320/132, 133
See application file for complete search history.

(56) References Cited

U.S. PATENT DOCUMENTS 5,302,858 A *   4/1994  Folts ........................... 307/66
6,639,386 B1 * 10/2003  Shiojima ................... 320/132
6,784,641 B1 *  8/2004  Sakai et al. ................ 320/132

FOREIGN PATENT DOCUMENTS

| JP | 09293539   | * 11/1997 |
| JP | 11064472   | *  3/1999 |
| JP | 2002-27683 |    1/2002 |
| JP | 2002-258993|    9/2002 |

\* cited by examiner

*Primary Examiner*—Pia Tibbits
(74) *Attorney, Agent, or Firm*—Westerman, Hattori, Daniels & Adrian, LLP

(57) ABSTRACT

An uninterruptible power supply device has a power supply circuit for supplying power from a power source to electronic equipment, a power interruption detection section for detecting interruption of the power supply from the power source, and a rechargeable battery charged by the power source. The uninterruptible power supply device further includes control means for controlling charging of the rechargeable battery in accordance with a charge state of the battery and also controlling the power supply from the rechargeable battery to the electronic equipment, and timer means for stopping the power supply to the control means after a lapse of a fixed time period from generation of a power interruption signal or shut-down signal, whereby wasteful consumption of electric energy stored in the rechargeable battery can be suppressed and also charge control for the rechargeable battery can be smoothly restarted at the recovery from power outage or at the start of the device.

4 Claims, 3 Drawing Sheets

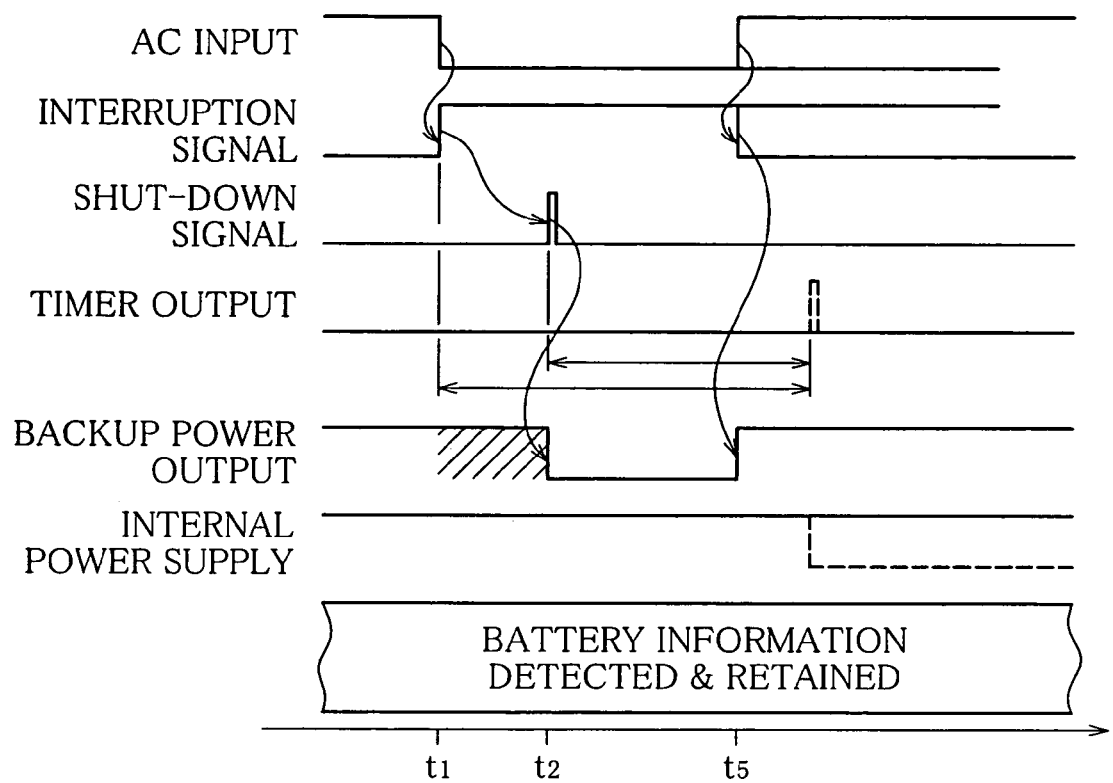

UNINTERRUPTIBLE POWER SUPPLY DEVICE

CROSS-REFERENCE TO A RELATED APPLICATION

This application claims priority of Japanese Patent Application No. 2003-282088, the entire contents of which are incorporated herein by reference.

BACKGROUND OF THE INVENTION

1. Field of the Invention

This invention relates to an uninterruptible power supply device for supplying backup power to electronic equipment such as a computer in case of interruption of power supply from a power source, and more particularly, to an interruptible power supply device which is configured to save electric power.

2. Description of the Related Art

If electronic equipment using commercial power (alternating-current power) as a power source, such as personal computers or servers, undergoes a momentary interruption or outage of power supply during operation thereof, various inconveniences can be caused such as the occurrence of error in the processing operation itself or the loss of valuable processing data. Accordingly, various attempts have been made to eliminate such inconveniences, as disclosed in Unexamined Japanese Patent Publications Nos. 2002-27683 and 2002-258993 in which a power supply system for this kind of electronic equipment is provided with an uninterruptible power supply device including a rechargeable battery, and in case of outage of commercial power supply (external power source), backup power is supplied from the rechargeable battery to the electronic equipment to ensure continued processing operation of the equipment and to protect processing data.

Such an uninterruptible power supply device is generally configured such that the rechargeable battery is charged by electric power from commercial power supply, and in case of power outage, the rechargeable battery supplies (discharges) the power stored therein to the electronic equipment to thereby provide backup power necessary for the operation of the electronic equipment. Also, in order to prevent wasteful consumption of the power stored in the rechargeable battery, the uninterruptible power supply device is often configured so as to stop its operation after supplying power to the electronic equipment for a period of time necessary for the equipment to complete a predetermined process such as saving of data, for example.

In the case where the operation of the uninterruptible power supply device is stopped after a lapse of the backup period as mentioned above, the rechargeable battery status monitoring function performed by the uninterruptible power supply device also stops, with the result that the charge state of the rechargeable battery cannot be monitored thereafter. As an alternative measure, information about the status (battery voltage, remaining capacity, etc.) of the rechargeable battery, for example, may be saved in a nonvolatile memory such as EEPROM or flash memory when the operation of the uninterruptible power supply device is stopped. Writing data in this type of nonvolatile memory, however, requires substantial time. Moreover, if the uninterruptible power supply device is not restarted for a long time (e.g., several months or more), there arises a marked discrepancy between the battery status stored in the nonvolatile memory and the actual status of the rechargeable battery due to self-discharge thereof.

SUMMARY OF THE INVENTION

This invention was created in view of the above circumstances, and an object thereof is to provide an uninterruptible power supply device which permits charge control for a rechargeable battery to be smoothly restarted when power supply from an external power source is restarted after an interruption thereof and which also can suppress wasteful consumption of the power stored in the rechargeable battery.

To achieve the object, an uninterruptible power supply device according to the present invention comprises: a power supply circuit for receiving electric power from an external power source, such as commercial power supply, and supplying the power to predetermined electronic equipment; a rechargeable battery for storing (charging therein) the power from the power source, the rechargeable battery supplying (discharging) the power stored therein to the electronic equipment, in place of the power supply circuit, when supply of the power from the power source is interrupted; control means (charge control function and backup control function) operating on the power supplied from the power source or the rechargeable battery, the control means controlling charging of the rechargeable battery in accordance with a charge state (e.g., battery voltage, battery temperature, charge/discharge current, etc.) of the rechargeable battery, and also controlling the power supply from the rechargeable battery to the electronic equipment; a power interruption detection section for outputting a power interruption signal to the electronic equipment and/or the control means when the power supply from the power source is interrupted; and timer means (operation control function) for stopping supply of the power to the control means after a lapse of a fixed time period from generation timing of the power interruption signal or from reception of a shut-down signal from the electronic equipment.

The control means updates and stores status of the rechargeable battery if the fixed time period is not yet elapsed, and does not newly store the status of the rechargeable battery if the fixed time period has elapsed.

Preferably, the control means stops the power supply from the rechargeable battery to the electronic equipment when the shut-down signal is received from the electronic equipment or after a lapse of a time period set taking account of a time period necessary for the electronic equipment supplied with the power interruption signal to complete a predetermined process. Because of this function, the control means can prevent wasteful consumption of the power stored in the rechargeable battery.

Also preferably, if the power supply from the power source is restarted within the fixed time period after generation of the power interruption signal, the control means restarts the charge control for the rechargeable battery in accordance with the stored status of the rechargeable battery. On the other hand, if the power supply from the power source is restarted after a lapse of the fixed time period from generation of the power interruption signal, the control means newly detects the status of the rechargeable battery and starts the charge control for the rechargeable battery in accordance with the detected status.

In the uninterruptible power supply device constructed as described above, backup power is simply supplied from the rechargeable battery to the electronic equipment for a given time period. Also, the uninterruptible power supply device stops the power supply to the control means after a lapse of the fixed time period from generation timing of the power interruption signal or from reception of the shut-down signal from the electronic equipment. Accordingly, the control means can effectively suppress wasteful consumption of the electric energy stored in the rechargeable battery.

Also, even if the power supply from the external power source is interrupted, the control means can thereafter be supplied with electric power from the rechargeable battery over the fixed time period. Thus, the charge control for the rechargeable battery is not adversely affected even if the control means has no nonvolatile memory incorporated therein. For example, when the power supply from the power source is restarted before the power supply to the control means is stopped, and thus the uninterruptible power supply device is restarted, the control means can quickly restart the charge control for the rechargeable battery in accordance with the status information of the rechargeable battery acquired at the time of interruption of the power supply. If the power supply from the external power source is restarted after the power supply to the control means is stopped, that is, after a lapse of the fixed time period, information accurately showing the status of the rechargeable battery is lost. In this case, therefore, the control means newly detects the status of the rechargeable battery and starts the charge control. For the battery in accordance with the detected status. Thus, the control means is free from the disadvantage that the charge control is executed in accordance with unreliable information.

In the case where it is customary to switch on the uninterruptible power supply device on Monday morning and switch off the same on Friday evening, for example, 70 hours or thereabout may be set as the fixed time period for which the control means is supplied with electric power before being stopped. By setting the fixed time period in consideration of such a regular non-operation time, it is possible to eliminate the labor of detecting the status of the rechargeable battery each time the uninterruptible power supply device is started, as well as to restart the charge control for the rechargeable battery by directly using the information acquired when the uninterruptible power supply device was switched off last.

BRIEF DESCRIPTION OF THE DRAWINGS

FIG. 3 is a chart showing operation timing of the uninterruptible power supply device of FIG. 1 in the case of a short interruption time.

DETAILED DESCRIPTION OF THE PREFERRED EMBODIMENT

An uninterruptible power supply device according to an embodiment of the present invention will be hereinafter described with reference to the drawings.

Figure 1:
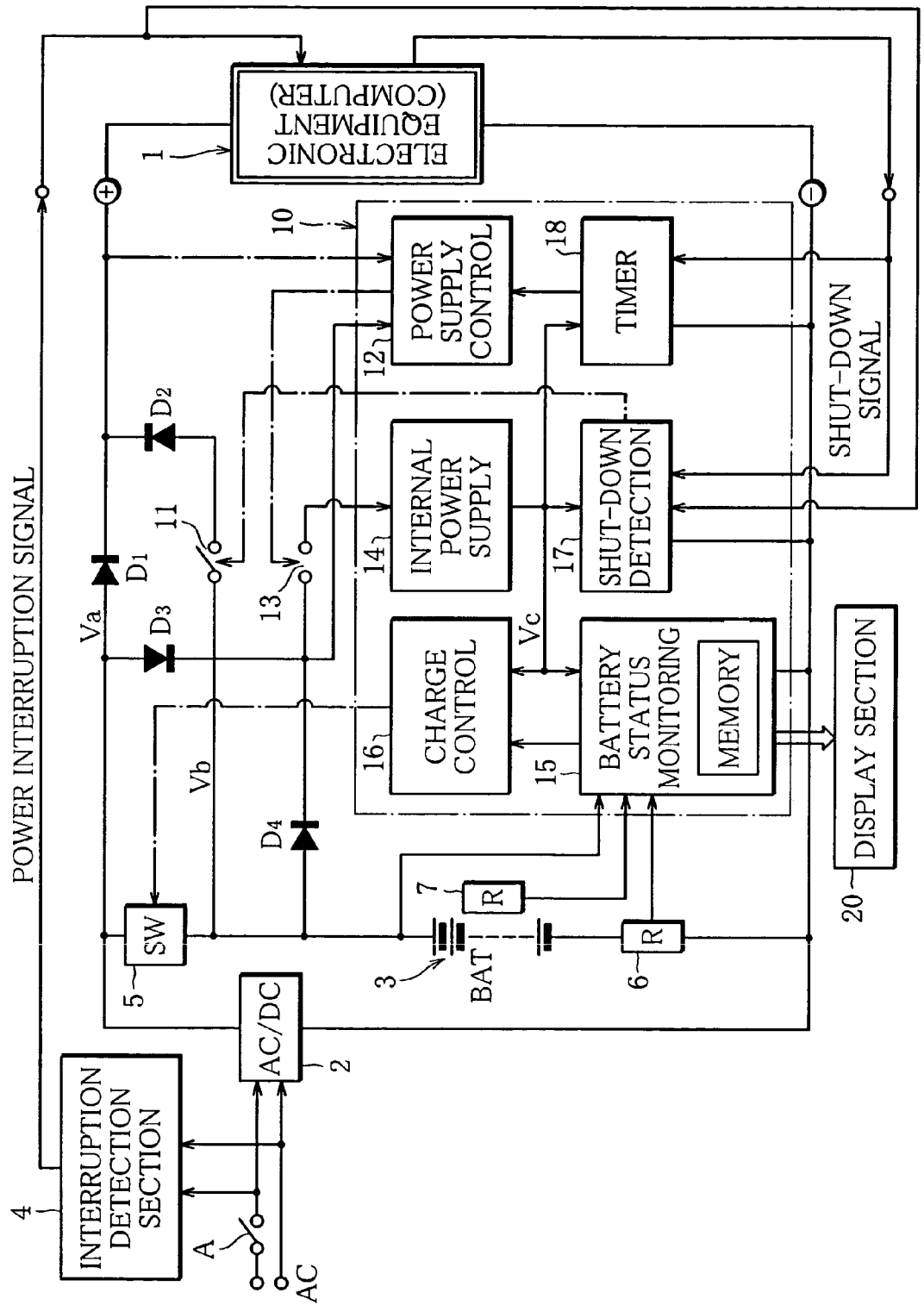
FIG. 1 is a schematic diagram showing the arrangement of a principal part of an uninterruptible power supply device according to an embodiment of the present invention.

FIG. 1 illustrates the arrangement of a principal part of the uninterruptible power supply device according to the embodiment, wherein reference numeral 1 denotes electronic equipment (load) such as a computer, which is to be backed by the uninterruptible power supply device. Basically, the uninterruptible power supply device includes a power supply circuit 2 for converting commercial power (alternating-current power) supplied from an external power source (electric power station) to a predetermined direct-current voltage Va and supplying the voltage to the electronic equipment 1, and a rechargeable battery (BAT) 3 which normally stores (charges therein) the power from the commercial power supply and which supplies (discharges) the stored power to the electronic equipment 1 when the commercial power supply is interrupted. Further, the uninterruptible power supply device includes a power interruption detection circuit (power interruption detection section) 4 for detecting a power interruption caused by outage of the commercial power or by the operation of a manual switch A to generate a power interruption signal and outputting the generated signal to a control circuit 10.

The power supply circuit 2 comprises an AC/DC converter constituted by an inverter etc. The DC voltage Va generated by the power supply circuit 2 is supplied to a diode D1 in a forward direction thereof, and then to the electronic equipment 1. The rechargeable battery 3, which is a Ni-MH battery, a Li ion battery or the like, receives the DC power generated by the power supply circuit 2 through a charge control switching element 5 constituted by a MOSFET etc., and stores the DC power therein by being charged. The power stored in the rechargeable battery 3 is output, as a DC voltage Vb, to the electronic equipment 1 through an output control switch 11, described later, and a diode D2 in a forward direction thereof.

A shunt resistor 6 is connected in series with the rechargeable battery 3, and a charge/discharge current I of the rechargeable battery 3 is detected through the shunt resistor 6. A temperature sensor 7 such as a thermistor is arranged in the vicinity of the rechargeable battery 3, and a temperature T of the rechargeable battery 3 is detected through the temperature sensor 7. The charge/discharge current I and the battery temperature T are used, along with a terminal voltage (battery voltage) V of the rechargeable battery 3, as information indicative of the charge state of the rechargeable battery 3 when charge control, described later, is performed.

The control circuit (control means) 10 controls charging of the rechargeable battery 3 in accordance with the charge state, such as the battery voltage and remaining capacity, of the battery 3 and also controls the power supply from the rechargeable battery 3 to the electronic equipment 1. The control circuit (control means) 10 receives the DC power (DC voltage Va) generated by the power supply circuit 2 through a diode D3 or the DC power (DC voltage Vb) stored in the rechargeable battery 3 through a diode D4, and operates on the power supplied thereto. Specifically, the control circuit 10 includes a power supply control section 12 for turning on and off an internal power supply switch 13, and an internal power supply circuit 14 which is input with the DC power Va or Vb from the power supply circuit 2 or the rechargeable battery 3 through the internal power supply switch 13 to generate an internal power supply voltage Vc necessary for the operation of the control circuit 10. The control circuit 10 operates on the voltage Vc generated by the internal power supply circuit 14.

Also, the control circuit 10 includes a battery status monitoring section 15 for monitoring the status of the rechargeable battery 3 on the basis of the battery voltage V, charge/discharge current I and battery temperature T detected as mentioned above. The control circuit 10 further includes a charge control section 16 for turning on and off the charge control switching element 5 in accordance with the result of monitoring by the battery status monitoring section 15, to control the charging of the rechargeable battery 3. The charge control section 16 discriminates a full charge state of the rechargeable battery 3 on the basis of change in the battery voltage V, change in the battery temperature T, etc., to prevent overcharge of the battery 3. Further, in accordance with the charge capacity (remaining capacity) of the rechargeable battery 3 obtained from the battery voltage V, charge/discharge current I, etc., the charge control section 16 performs charge control for the battery 3 to maintain the charge capacity of the battery 3 at a level higher than or equal to a fixed value and at the same time to prevent overcharge of the battery 3.

As such charge control for the rechargeable battery 3, a suitable control procedure may be selected from among various control procedures hitherto proposed. In this embodiment, the battery status monitoring section 15 stores, in an internal memory 15a thereof, the voltage generated at the shunt resistor 6. Also, the battery temperature T and ambient temperature are detected at regular intervals, and distributions of the detected temperatures, etc. are stored in the internal memory 15a. Further, the battery status monitoring section 15 detects various anomalies such as battery voltage anomaly, battery temperature anomaly, charge/discharge current anomaly and power supply temperature anomaly, and stores the detected anomalies in the internal memory 15a as alarm information. The information stored in the internal memory 15a is displayed at a display section 20 as battery status monitoring information.

In this embodiment, the following three cases (a), (b) and (c) are supposed, as situations where the power supply to the uninterruptible power supply device and the electronic equipment 1, or a computer, is interrupted:

(a) Power failure or outage occurs while the electronic equipment 1 is on.

(b) The manual switch A is turned off while the electronic equipment 1 is on.

(c) The electronic equipment 1 is switched off, and then the manual switch A is turned off.

In the following, the cases (a) and (b) will be explained.

The uninterruptible power supply device of the present invention, which has the basic construction and functions described above, is characterized in that the control circuit 10 is provided with a shut-down detection circuit 17 which is input with the interruption signal from the power interruption detection circuit 4 as well as a shut-down signal from the electronic equipment 1 to control the operation of the output control switch 11, and a timer circuit 18 operative in response to the shut-down signal input thereto. For example, in the case where a given time period has elapsed after the interruption signal is supplied to the shut-down detection circuit 17 from the power interruption detection section 4 or where the shut-down signal is supplied to the shut-down detection circuit 17 from the electronic equipment 1, it can be judged that the electronic equipment 1 is normally stopped (switched off). Accordingly, the shut-down detection circuit 17 turns off the output control switch 11 at the same time that the shut-down signal is received, thereby stopping the power supply from the rechargeable battery 3 to the electronic equipment 1. Namely, even if the power supply from the external power source is interrupted, the output control switch 11 remains in a conduction state (on state) thereafter until the electronic equipment 1 completes a predetermined termination process, and thus power is supplied to the electronic equipment 1 from the rechargeable battery 3.

When the power switch (not shown) of the electronic equipment 1 such as a computer is turned off or when the power interruption signal is received, the electronic equipment first executes the predetermined termination process, such as saving of programs or data then loaded therein, outputs the shut-down signal, and stops its operation. The shut-down detection circuit 17 confirms termination of the operation of the electronic equipment 1 by detecting the shut-down signal input thereto, and turns off the output control switch 11 on receiving the shut-down signal.

Because of the output control switch 11 controlled in this manner, even if the commercial power fails or when the manual switch A is turned off, backup power can be supplied thereafter from the rechargeable battery 3 to the electronic equipment 1 without fail until the electronic equipment 1 completes the predetermined termination process.

When the power of the electronic equipment 1 itself is turned off, the electronic equipment 1 remains backed thereafter by the rechargeable battery 3 for a given time period until it completes the predetermined termination process. After a lapse of the given time period, the output control switch 11 is turned off in response to generation of the shut-down signal, thus terminating the backup function of the rechargeable battery 3. While the operation of the electronic equipment 1 is stopped with the output control switch 11 turned off, the power supply from the rechargeable battery 3 to the electronic equipment 1 is suspended, whereby the electric energy stored in the rechargeable battery 3 can be prevented from being wasted such as by standby operation of the electronic equipment 1.

In the above instance, the output control switch 11 is controlled or turned off upon detection of the shut-down signal from the electronic equipment 1. Alternatively, the control circuit 10 may be configured such that, for example, the output control switch 11 turns off independently after a lapse of a time period set taking account of the given time period necessary for the electronic equipment 1 to complete the predetermined termination process after generation of the power interruption signal. In this case, the time period after the lapse of which the output control switch 11 is to turn off should preferably be adjustable in accordance with the specification etc. of the electronic equipment 1 to be backed.

The timer circuit 18, on the other hand, starts to measure a fixed time period on receiving the interruption signal or the shut-down signal, and outputs an internal operation stop signal to the power supply control section 12 after a lapse of the fixed time period. The fixed time period measured by the timer circuit 18 is significantly longer than the time period necessary for the electronic equipment 1 to complete the predetermined termination process and is set to, for example, about 70 hours. In response to the internal operation stop signal generated after a lapse of the fixed time period, the power supply control section 12 turns off the internal power supply switch 13 to stop the power supply to the internal power supply circuit 14. As a result, the power supply to the battery status monitoring section 15 etc. is stopped, so that the operation of the entire control circuit 10 except the power supply control section 12 stops. It is therefore possible to prevent the electric energy stored in the rechargeable battery 3 from being wasted by the control circuit 10.

The power supply control section 12 is constantly supplied with power from the power supply circuit 2 or the rechargeable battery 3, and even while the operation of the control circuit 10 is stopped, the power supply control section 12 alone keeps operating. When the commercial power supply recovers from outage or when the supply of predetermined DC power from the power supply circuit 2 or the rechargeable battery 3 to the electronic equipment 1 is started by, for example, turning on the manual switch A, the power supply control section 12 detects the start of power supply and turns on the internal power supply switch 13 to supply power to the internal power supply circuit 14, whereby the control circuit 10 is started in its entirety.

Figure 2:
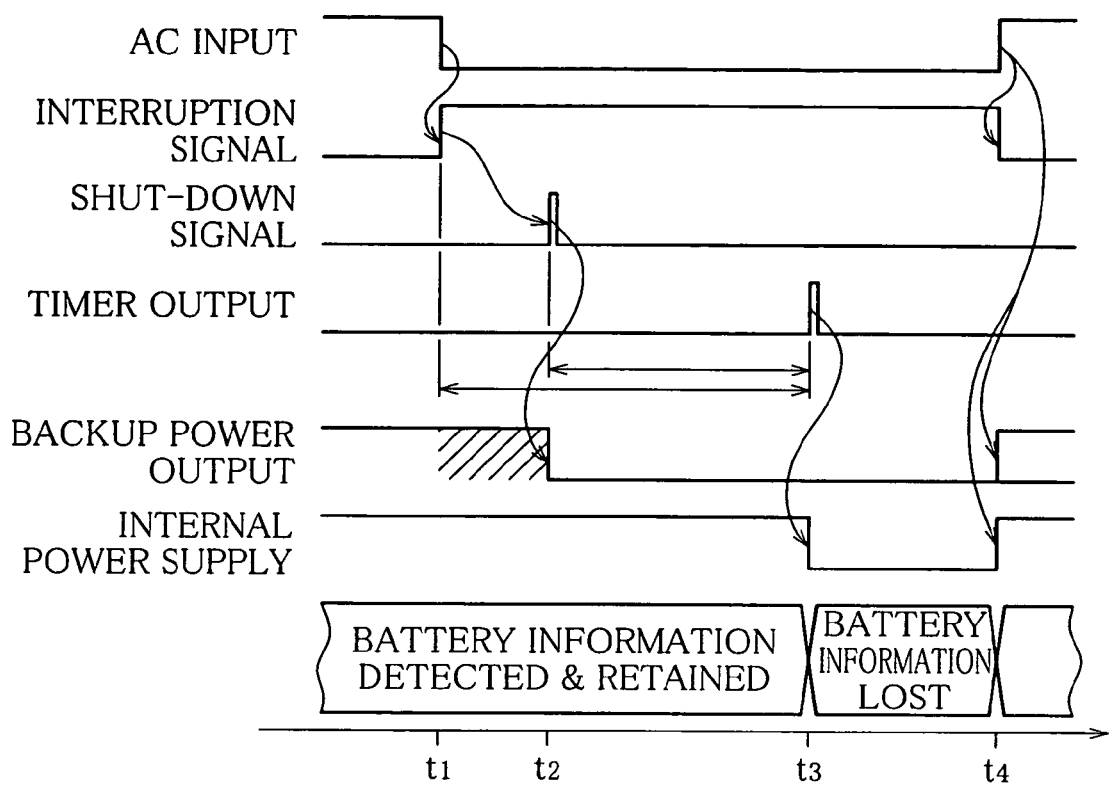
FIG. 2 is a chart showing operation timing of the uninterruptible power supply device of FIG. 1 in the case of a long interruption time.

In the uninterruptible power supply device constructed as described above, when the external power supply (commercial power supply) is interrupted or the power switch is turned off at time t1, shown in the operation timing charts of FIGS. 2 and 3, the power interruption signal is generated on detection of the interruption of power. Simultaneously with this, the power supply from the rechargeable battery 3 to the electronic equipment 1 is started to permit continued operation of the equipment 1. At time t2 upon lapse of the given time period (e.g., three minutes) from the ouput of the power interruption signal, the shut-down signal is generated from the electronic equipment 1. On receiving the shut-down signal, the uninterruptible power supply device turns off the output control switch 11 to stop the supply of backup power from the rechargeable battery 3 to the electronic equipment 1.

When the timer circuit 18 thereafter completes measurement of the fixed time period (at time t3) without the external power supply (commercial power supply) recovering from outage, a timer output (internal operation stop signal) is generated, as shown in FIG. 2. In response to the internal operation stop signal, the output of the internal power Vc in the control circuit 10 is stopped, and thus the operation of the control circuit 10 stops at and after time t3. When the external power supply (commercial power supply) is restarted thereafter at time t4, the power supply to the electronic equipment 1 is started and also charging of the rechargeable battery 3 is restarted.

In this case, the power supply to the control circuit 10 has been stopped for the period from time t3 to time t4, and accordingly, the information acquired by the battery status monitoring section 15, such as the charge state and other status of the rechargeable battery 3, is lost. Since the control circuit 10 is restarted at time t4 despite the loss of information, the control circuit 10 detects the battery status such as the remaining capacity of the rechargeable battery 3, as an initial process, and performs the charge control for the rechargeable battery 3 in accordance with the newly detected information. Specifically, to detect the remaining capacity of the rechargeable battery 3, the voltage of the battery 3 may be measured to obtain a rough estimate of the remaining capacity. Alternatively, the battery voltage and the battery temperature may be measured, and based on a previously obtained relationship between battery voltage and battery temperature, a rough estimate of the remaining capacity may be derived. When the rechargeable battery 3 becomes fully charged thereafter, the capacity then remaining may be set as 100%.

On the other hand, if the external power supply (commercial power supply) is restarted or the power switch is turned on (at time t5) before the timer circuit 18 completes measurement of the fixed time period, as shown in FIG. 3, the power supply to the electronic equipment 1 is restarted and the timer circuit 18 is reset. As a result, no timer output (no internal operation stop signal) is generated from the timer circuit 18, and thus the control circuit 10 keeps operating with the internal power Vc continuously supplied thereto. Namely, the operation of the control circuit 10 is not stopped and information indicative of the detected charge state and other status of the rechargeable battery 3 is continually saved. At time t5 when the external power supply (commercial power supply) is restarted, the control circuit 10 restarts the charge control for the rechargeable battery 3 in accordance with the saved information indicative of the charge state and other status of the battery 3. In this case, the charge control may of course be restarted after the remaining capacity is corrected based on the temperature etc. of the rechargeable battery 3 to compensate for self-discharge etc. Consequently, charging of the rechargeable battery 3 can be controlled by directly using the information indicative of the charge state and other status of the battery 3 detected until then.

With the uninterruptible power supply device described above, charging of the rechargeable battery 3 can be easily and effectively controlled without using a nonvolatile memory such as EEPROM. Also, in cases where the electronic equipment 1 and the uninterruptible power supply device are stopped for a long period of time or power outage lasts for a long period of time, the operation of the control circuit 10 is stopped, thus making it possible to effectively suppress wasteful power consumption by the control circuit 10. Further, it is not-necessary to predict the remaining capacity of the rechargeable battery 3 on the basis of power outage time etc., unlike conventional devices. In the case where the power outage (non-operation) time is long, the charge state and other status of the rechargeable battery 3 are detected anew. Accordingly, the charge control for the rechargeable battery 3 can be properly carried out without being influenced by past data of poor reliability.

In the case where the electronic equipment 1 is manually switched off and then the manual switch A is turned off, as in the aforementioned case (c), the interruption signal is input to the shut-down detection circuit 17 from the power interruption detection circuit 4, and at this point of time, the control circuit 10 has already been supplied with the shut-down signal (or a signal corresponding thereto) from the electronic equipment 1 which is then terminated. Accordingly, the switch 11 may be turned off and the timer circuit 18 may be started to measure time, as in the aforementioned cases (a) and (b). The uninterruptible power supply device operates thereafter in the same manner as in the cases (a) and (b), and therefore, description of the subsequent operation is omitted.

The present invention is not limited to the above embodiment alone. In the foregoing embodiment, when the measurement of the fixed time period by the timer circuit 18 is completed, the function of the control circuit 10 is stopped, and when the external power supply recovers from outage or the power switch is turned on thereafter, the status of the rechargeable battery 3 is again obtained. In such cases, the rechargeable battery 3 may still have sufficient remaining capacity. Thus, the relationship between battery voltage and remaining capacity, for example, may be formulated beforehand as a table or mathematical expression correlated with the capacity or temperature at the start of discharge, and the remaining capacity may be obtained from the table or the mathematical expression on the basis of the battery voltage V detected at the time of recovery from outage, to carry out the charge control for the rechargeable battery 3. In this case, when battery full charge is detected, the capacity then remaining in the battery may be set as 100%, whereby the remaining capacity can be accurately calculated thereafter.

Also, in the foregoing embodiment, the timer circuit 18 is started on reception of the shut-down signal. The uninterruptible power supply device may alternatively be configured such that the timer circuit 18 is started by using generation of the power interruption signal as reference timing. It is also useful to write the aforementioned alarm information about various anomalies into a nonvolatile memory at the time of occurrence of power outage or at the time of generation of the shut-down signal or immediately before the operation of the control circuit 10 is stopped by the timer circuit 18 so that the saved information can be used as historical data. Further, the shut-down signal may be internally generated within the control circuit 10 taking account of the time period necessary for the backup process of the electronic equipment 1. It is to be noted that the present invention can be modified in various other ways without departing from the scope of the invention.

What is claimed is:

1. An uninterruptible power supply device comprising:
   a power supply circuit for supplying electric power from an external power source to electronic equipment;
   a rechargeable battery for storing the power from the power source, said rechargeable battery supplying the power stored therein to the electronic equipment, in place of said power supply circuit, when supply of the power from the power source is interrupted and also the electronic equipment is on;
   control means operating on the power supplied from the power source or said rechargeable battery, said control means controlling charging of said rechargeable battery in accordance with a charge state of said rechargeable battery and also controlling the power supply from said rechargeable battery to the electronic equipment;
   a power interruption detection section for outputting a power interruption signal to the electronic equipment and/or said control means when the power supply from the power source is interrupted; and
   timer means for stopping supply of the power to said control means after a lapse of a fixed time period from generation timing of the power interruption signal or from reception of a shut-down signal from the electronic equipment,
   wherein said control means updates and stores status of said rechargeable battery if the fixed time period is not yet elapsed, and does not newly store the status of said rechargeable battery if the fixed time period has elapsed.

2. The uninterruptible power supply device according to claim 1, wherein said control means stops the power supply from said rechargeable battery to the electronic equipment when the shut-down signal is received from the electronic equipment or after a lapse of a time period set taking account of a time period necessary for the electronic equipment supplied with the power interruption signal to complete a predetermined process.

3. The uninterruptible power supply device according to claim 1, wherein, if the power supply from the power source is restarted within the fixed time period after generation of the power interruption signal, said control means restarts the charge control for said rechargeable battery in accordance with the stored status of said rechargeable battery.

4. The uninterruptible power supply device according to claim 1, wherein, if the power supply from the power source is restarted after a lapse of the fixed time period from generation of the power interruption signal, said control means newly detects the status of said rechargeable battery and starts the charge control for said rechargeable battery in accordance with the detected status.

* * * * *